INVENTORS
EDGAR O. McALISTER
RICHARD L. MYERS
ROBERT L. BROXHOLME
BY
ATTORNEYS

May 31, 1966   E. O. McALISTER ETAL   3,254,297
PULSE TRANSMISSION METHOD AND APPARATUS FOR GEOPHYSICAL
PROSPECTING UTILIZING MEANS FOR GENERATING UNIPOLAR
PULSES BETWEEN GROUPS OF PERIODIC PULSES
Filed Oct. 25, 1960   4 Sheets-Sheet 4
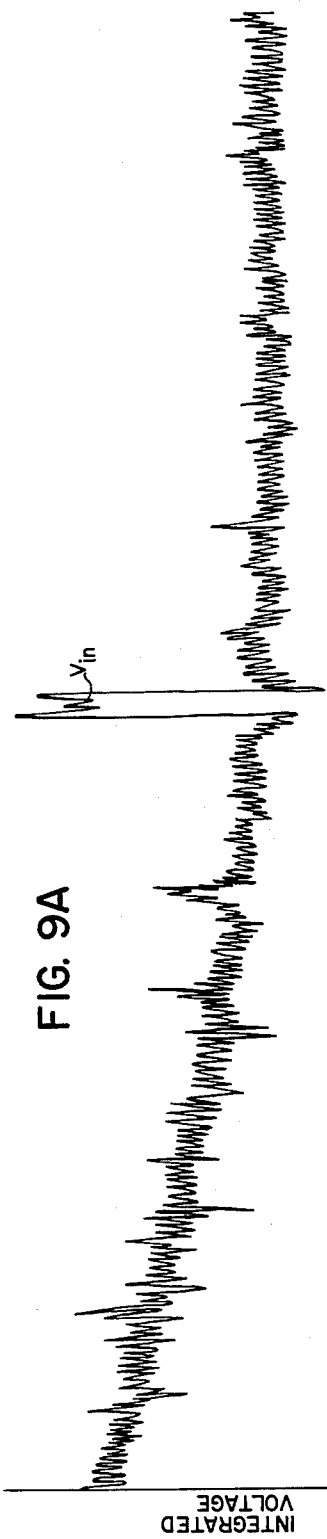
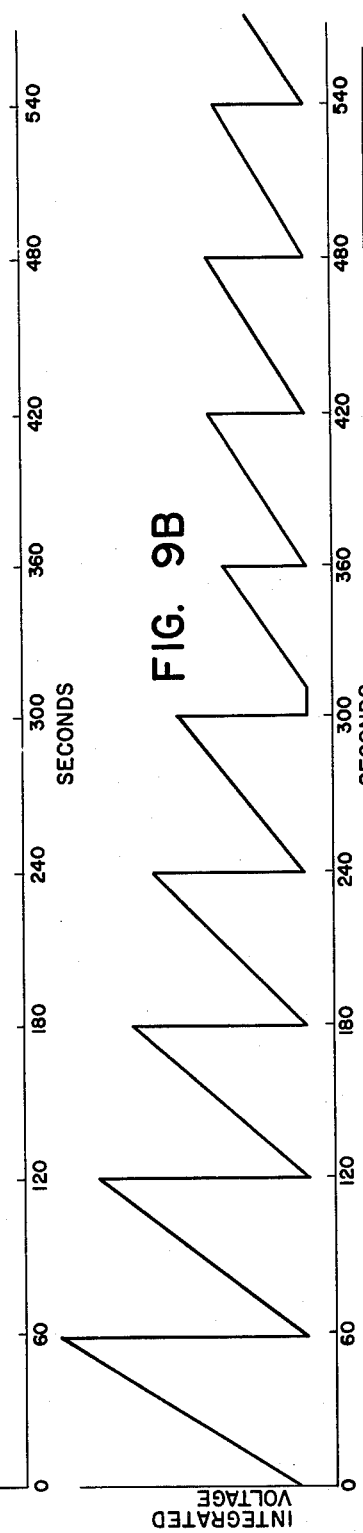
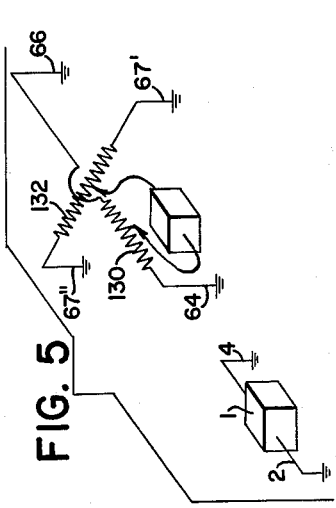
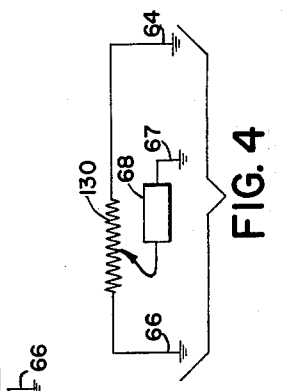
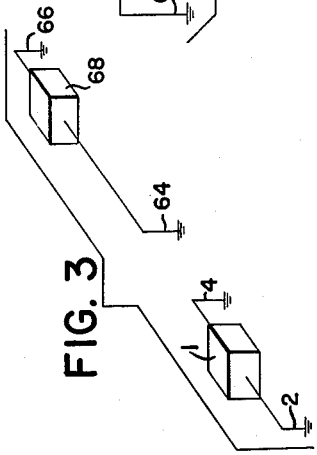
INVENTORS
EDGAR O. McALISTER
RICHARD L. MYERS
ROBERT L. BROXHOLME
BY
ATTORNEYS

United States Patent Office 3,254,297
Patented May 31, 1966

3,254,297
PULSE TRANSMISSION METHOD AND APPARATUS FOR GEOPHYSICAL PROSPECTING UTILIZING MEANS FOR GENERATING UNIPOLAR PULSES BETWEEN GROUPS OF PERIODIC PULSES
Edgar O. McAlister, Tooele, Richard L. Myers, Salt Lake City, and Robert L. Broxholme, Tooele, Utah, assignors to The Anaconda Company, New York, N.Y., a corporation of Montana
Filed Oct. 25, 1960, Ser. No. 64,786
13 Claims. (Cl. 324—1)

This invention relates to geophysical exploration by electrical methods, and more particularly to a method and apparatus for measuring the phase shift imposed by mineral deposits on the propagation of an alternating current through the earth and for measuring the alterations in that phase shift produced by the propagation of a direct current through the earth.

In our co-pending application Serial No. 641,331, filed February 20, 1957, now Patent No. 2,988,691 we have disclosed an apparatus and method of geophysical exploration in which current pulses of successively opposite polarity are applied to the earth between spaced transmitter stakes, with intervals of zero current separating adjacent pulses. In the method of this co-pending application, therefore, the transmitted signal is characterized by a fundamental frequency which is the rate at which successive current pulses of the same polarity are applied to the ground.

According to the disclosure of that application, the voltages resulting from the application of such current pulses to the ground are observed between another pair of stakes which are connected to a receiver. Specifically, the ratio of the component of receiver voltage at the fundamental frequency occurring in the intervals between the appearance at the receiver stakes of the voltage pulses corresponding to the current pulses at the transmitter to the component of receiver voltage at that frequency occurring during those voltage pulses at the receiver, is taken as a measure of the phase shift undergone by that fundamental in the propagation of the current pulses through the earth. This ratio or phase shift supplies information from which inferences can be drawn concerning the make-up of the earth between the transmitting and receiving stations.

According to the present invention, there is further measured the change in this phase shift which is produced by a unipolar current pulse long in comparison to the period of the fundamental component of the rectangular transmitted current wave above described.

The invention will now be further described with reference to the accompanying drawings in which:

FIG. 3 is a diagram showing one arrangement of the transmitter and receiver and of their stake electrodes;

FIG. 4 is a diagram showing a connection of a receiver to three electrodes for the purpose of minimizing the effect on the receiver of spurious noise voltages in the ground;

FIG. 5 is a diagram of a connection of a receiver to four electrodes for further reducing the effect of noise voltages;

FIGS. 6 and 7 are diagrams showing modifications to that portion of FIG. 2 above line A—A therein to connect the receiver of FIG. 2 to sets of electrodes as illustrated in FIGS. 4 and 5 respectviely;

FIGS. 9A and 9B are graphs illustrating the results obtainable with the invention.

Figure 1:
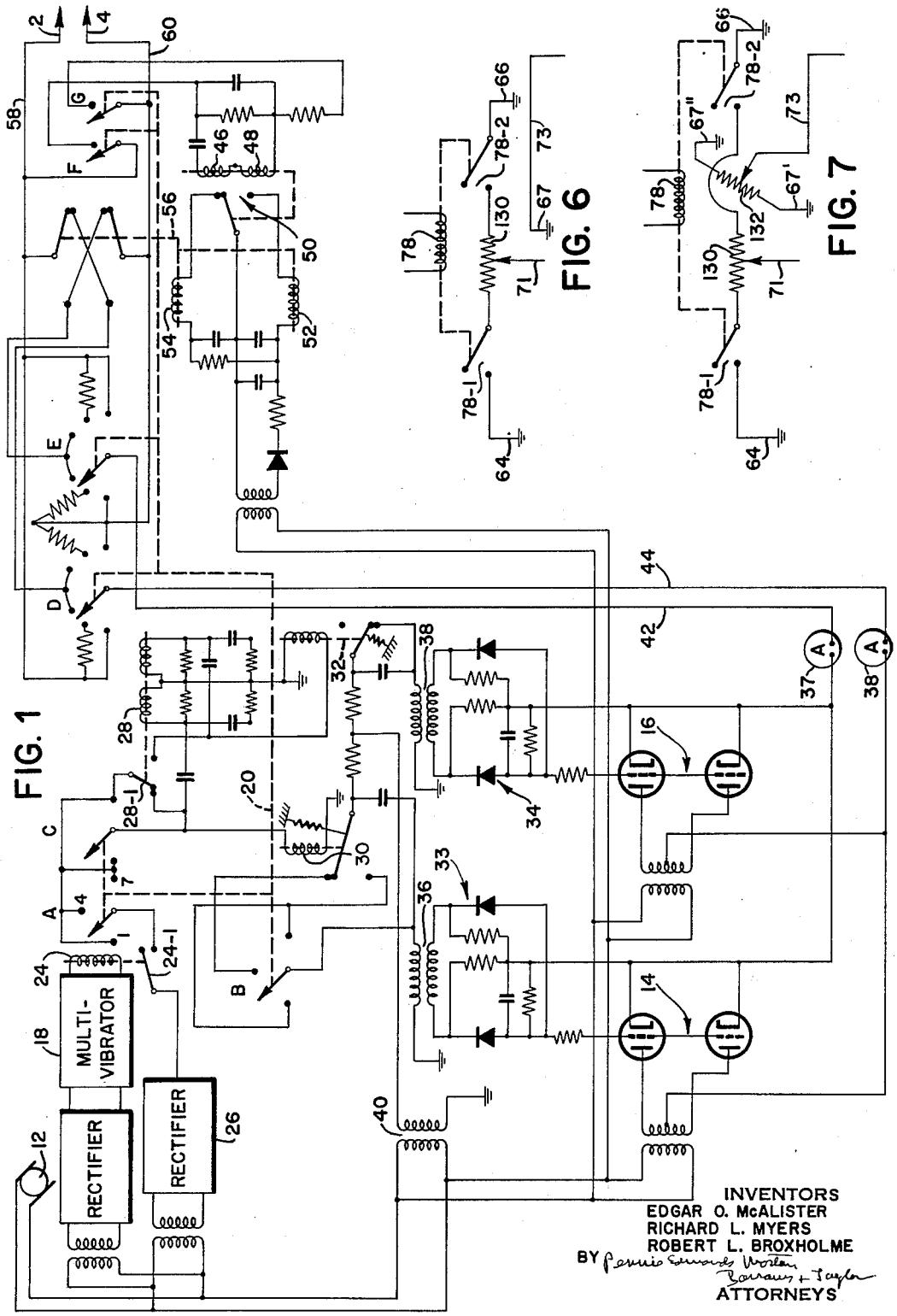
FIG. 1 is a diagram, partly schematic and partly in block form, of a transmitter suitable for use in practice of the invention.
Figure 8:
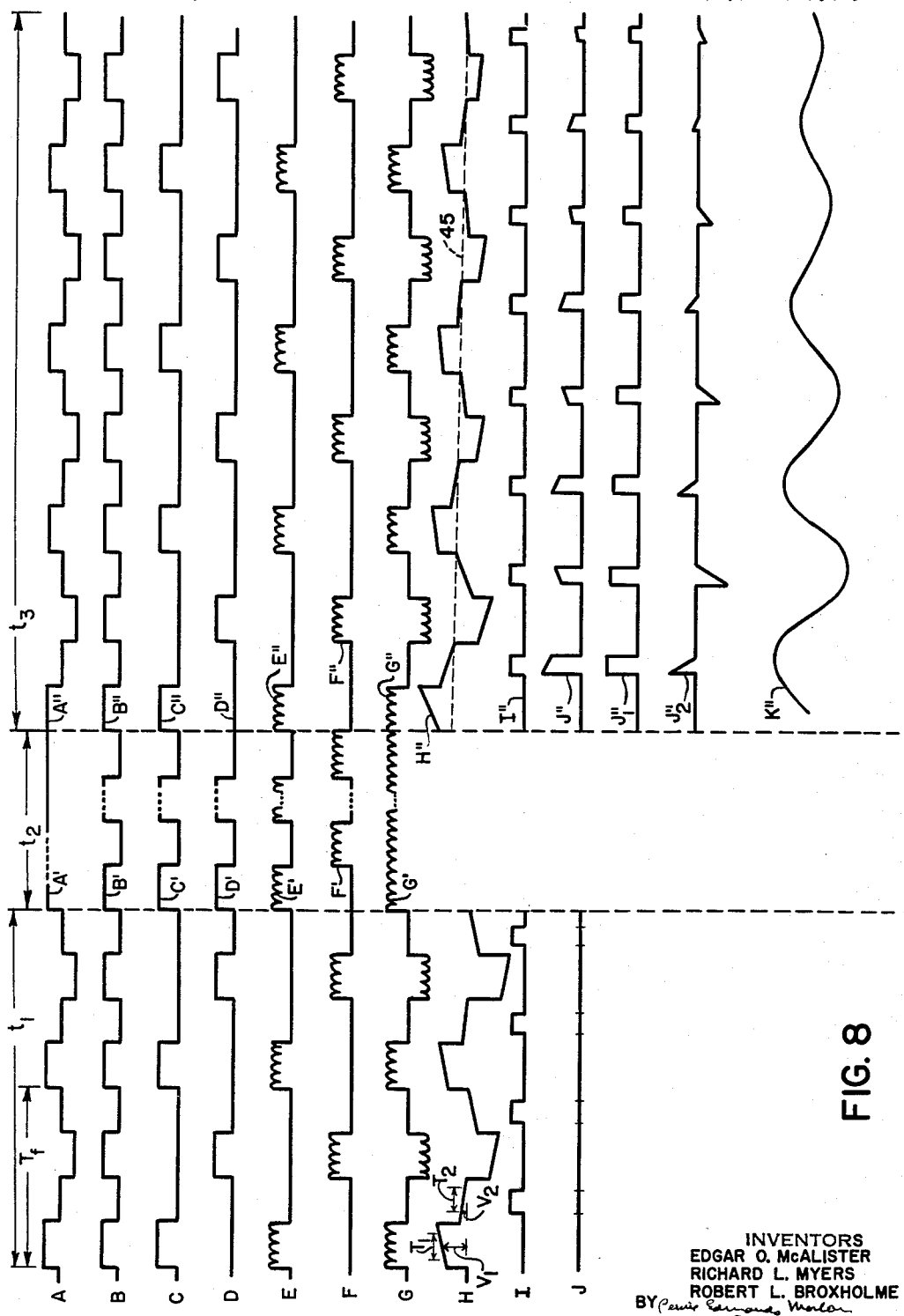
FIG. 8 is a set of waveforms useful in explaining the invention.

The transmitter of FIG. 1, and likewise the transmitter 1 of FIGS. 3 and 5, comprises apparatus suitable to cause to flow between electrodes 2 and 4, which take the form of stakes driven into the earth, currents of the type shown at A, A', and A" in FIG. 8. Current waveform A occurs during a time $t_1$ which may in practice be many minutes in duration. It comprises a rectangular current wave of alternating polarity. Current waveform A' occurs during a succeeding interval $t_2$ which may be shorter than $t_1$ but which is large compared to the period $T_t$ of the fundamental component of frequency in waveform A. Waveform A' is a direct current pulse. It is succeeded during time $t_3$ by waveform A", a renewal of waveform A.

The transmitter of FIG. 1 includes a source of electric power such as a gasoline engine-driven generator 12, capable for example of producing from 5 to 10 kw. of power at 115 volts, 400 c.p.s. A power rectifier comprising in the example illustrated two full-wave rectifiers generally indicated at 14 and 16 transform this A.C. energy into pulses of direct current under control of a multi-vibrator 18, which should have good frequency stability. By means of a selector switch 20 and a reversing relay 56 these pulses are applied between the stakes 2 and 4 according to any of waveforms A, A', and A" in FIG. 8.

The multi-vibrator output, shown at B in FIG. 8, is a square voltage wave of fundamental frequency $2/T_t$, wherein $T_t$ is the period of waveform A in FIG. 8. $T_t$ may be of the order of one-third of a second.

Multi-vibrator 18 drives a relay 24, the closing times of whose contacts 24-1 may be equally represented by waveform B, the upper portions thereof representing closure of those contacts.

The contacts of relay 24 conduct a D.C. voltage from a rectifier 26 to the movable contact of deck A in switch 20. In position 4 of this switch the voltage of waveform B is supplied to the movable contact 28-1 of a switching relay 28, each pulse in waveform B shifting that contact. Relay 28 thus distributes pulses of power from rectifier 26 to further relays 30 and 32 successively, energizing them in the sequence shown at waveforms C and D respectively in FIG. 8.

Bias voltage rectifiers generally indicated at 33 and 34 associated with power rectifiers 14 and 16 are fed from transformers 36 and 38, and these are connected to a supply transformer 40 via the contacts of relays 30 and 32 and (in the case of transformer 36) through the contacts of deck B in switch 20 in such fashion that with switch 20 on position 4, the primary circuits of transformers 36 and 38 are opened in the sequence indicated at waveforms C and D respectively. Interruption of supply to the bias rectifiers 33 and 34 permits rectifiers 14 and 16 to conduct, and the outputs of these latter rectifiers are accordingly of the form shown at waveforms E and F respectively, which include a ripple component at twice the frequency of source 12. This may be attenuated in amplitude by conventional filtering elements.

These outputs are combined on conductors 42 and 44, from which they pass through decks D, E, F and G of switch 20, to the coils 46 and 48 of a switching relay generally indicated at 50. Operation of relay 50 energizes alternately the coils 52 and 54 of a reversing relay 56 connected between conductors 42 and 44 and stakes 2 and 4. The time required for response of relay 50 to the current pulses E and F and the time required for the response of relay 56 to the operation of relay 50 are such that the contacts of relay 56 shift between the current pulses E and F on conductors 42 and 44 so as to develop on output conductors 58 and 60, which are connected in series through the earth between their stakes 2 and 4, a current as shown at waveform G, which is the same as waveform A except that it includes a ripple component.

By shift of switch 20 to its position 1 the voltage pulses from relay 24 are applied directly to the coil of relay 30 as well as to the movable contact 28–1 of relay 28. The result is that relays 30 and 32 respond together to all of the current pulses from relay 24 as shown at waveform B. The connections at deck B of switch 20 are, however, such that in position 1 the primary circuit for transformer 36 is now interrupted when relay 30 is de-energized. Consequently, rectifier 14 conducts during the gaps between the pulses of waveform B, while rectifier 16 conducts during those pulses. The sum of the outputs from rectifiers 14 and 16 is therefore a continuous direct current, with super-imposed ripple component, as shown at waveform G'. In position 7 of switch 20 the result is the same except that the continuous direct current is applied in the opposite polarity between the transmitter stakes 2 and 4. Upon restoration of switch 20 to position 4, the waveforms will again be those illustrated in time interval $t_1$ in FIG. 8, and thus are duplicated in time interval $t_3$ of that figure.

With the transmitter applying to the earth a current waveform as shown at G in FIG. 8, the voltage difference between a pair of spaced receiver stakes, near enough to the transmitter stakes for the effect of the current wave to be perceived above the various noise voltages in the earth, will have the general form of waveform H in FIG. 8, in which the ripple component has been omitted. FIG. 3 is a diagram showing one way in which a transmitter 1 may be connected to stakes 2 and 4, and how receiver stakes 64 and 66 may be positioned with respect to the transmitter for connection to a receiver 68. The leads from the transmitter and receiver to their respective stakes may be shielded and the spacing of the stakes from each other may be in accordance with the teachings of our co-pending application. Advantageously, the receiver 68 is located near one of the receiver stakes, such as stake 66, and has its chassis short-circuited thereto.

The voltage at H has the same repetition rate $1/T_t$ as does the transmitted current waveform G, although the pulses thereof may be delayed with respect to waveform G by the transit time between the transmitter and receiver locations, i.e. the locations of their pairs of stakes. In addition, waveform H exhibits a distortion in shape from the essentially rectangular shape of the pulses in waveform G, due in part to a delay or integration effect suffered by the fundamental component at $1/T_t$ frequency in this transmission. The amount of this integration can be determined from the constants of a differentiating network required to be employed in the receiver to restore the waveform H to the shape of waveform A. Apparatus suitable for such restoration is shown in our co-pending application, where it is described as a bridge which at balance measures the ratio $V_2T_2/V_1T_1$, wherein $T_1$ and $T_2$, as shown in waveform H, are respectively selected fractions of the times during which the pulses appear at the receiver and the intervals between them, and wherein $V_1$ and $V_2$ are respectively the average values of the pulses at the receiver during time $T_1$ and the average value of the delayed or residual voltage during times $T_2$. In practice it is convenient to make $T_1$ equal to the length of the received pulses.

We have found that if the waveform G at the transmitter is followed by a unipolar current pulse, as shown at G' in FIG. 8, the voltage waveform at the receiver assumes an altered shape, as shown at H'' in FIG. 8, upon return of the transmitter to waveform G'' (which is a duplicate of waveform G) and that the departure of H'' from H contains information of value in geophysical prospecting. This will be explained with reference to FIG. 2, which illustrates a receiver according to the invention suitable for practice of the invention.

Figure 2:
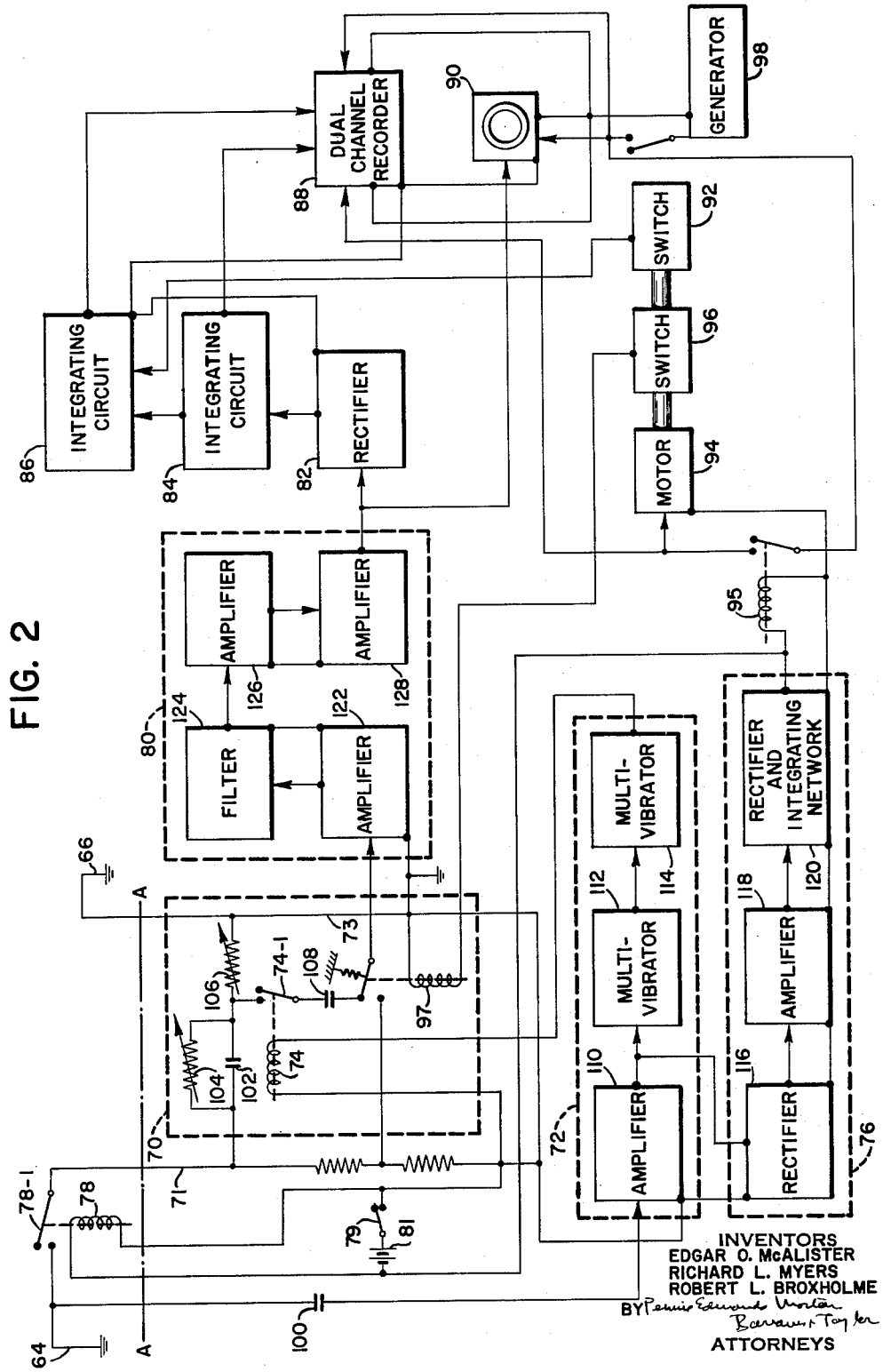
FIG. 2 is a diagram, partly schematic and partly in block form, of a receiver suitable for use in practice of the invention.

The receiver of FIG. 2 includes a bridge or differentiating circuit 70 for restoring the received waveform to the shape of waveform A in FIG. 8, a synchronizing channel 72 for switching the contacts 74–1 on relay 74 in the bridge at the proper times, a relay holding coil channel 76 which develops voltage for controlling on relay 78 the contacts which open and close the circuit between the receiver stakes 64 and 66 and the input to bridge 70, an amplifier 80 tuned to the $1/T_t$ frequency, a rectifier 82, two integrating circuits 84 and 86 in cascade therewith, and a two-channel recorder 88 on which the outputs of the integrating circuits are separately recorded. Circuits 84 and 86 have relatively short and relatively long time constants respectively. In addition, an oscilloscope 90 may be provided for examining the output of the amplifier 80. In the embodiment illustrated in FIG. 2 the amplifier 80 includes a first amplifying stage 122 followed by a filter 124 tuned to the $1/T_t$ frequency. The signal then passes to a Wien bridge amplifier 126 which further improves frequency selection to the $1/T_t$ frequency, and lastly to a booster amplifier stage 128 before delivery to the rectifier 82.

A switch 92 may be provided, driven under control of the channel 76 by a motor 94 or by equivalent means such as a thyratron relaxation oscillator, to short-circuit periodically the output of the long time constant integrating circuit 86. Coupled to switch 92 there may be provided a further switch 96 which at still longer time intervals energizes a relay 97 to disconnect the amplifier 80 from the bridge 70 and to substitute therefor a selected fraction of the voltage between the receiver stakes. Electric power for the receiver may be provided at an engine driven generator 98.

In the particular arrangement illustrated in FIG. 2, a receiver stake 66, preferably driven into the ground in the immediate vicinity of the receiver, connects to the chassis ground of the receiver. The distant receiver stake 64 is connected into the bridge through relay contacts 78–1. In addition, receiver stake 64 is led into the synchronizing channel 72 through a blocking capacitor 100. In the bridge a capacitor 102 and parallel resistor 104 connect through a resistor 106 to chassis ground, and the contacts 74–1 of the switching relay 74 connect to the input to the amplifier 80 through a further capacitor 108.

When the transmitter is operating "A.C." according to waveform G or G'', the synchronizing channel 72 develops a switching waveform at $2/T_t$ repetition rate, as shown at I in FIG. 8. This voltage closes relay contacts 74–1 for a fraction $T_2$ of the interval between the received current pulses of waveform H. Within the synchronizing channel 72 the ripple voltage of waveform G, at 800 c.p.s. in the case of a transmitter powered from a 400 cycle generator, and which appears in bursts at a $2/T_t$ rate, is amplified in an amplifier 110. Amplifier 110 drives a multivibrator 112 operating at the $2/T_t$ repetition rate. Multivibrator 112 drives a second multivibrator 114 at a controllable phase with reference to the bursts so that the pulses of waveform I to relay 74 will come between the received current pulses of waveform H as they appear between the receiver stakes.

Capacitor 102 and resistor 106 together with resistor 104 may be regarded as a differentiating network which upon adjustment of its variable elements 104 and 106 to suitable value will restore waveform H to the shape of waveform A. This condition is noted by means of a zero signal condition on the oscilloscope 90, and by zero signal in each of the channels of recorder 88.

To put the matter in a slightly different way, differentiation of waveform H in the proper amount will produce across resistor 106 a voltage reproducing waveform A. With a closing sequence for the contacts of relay 74 according to waveform I, the result is zero voltage input to amplifier 80. This condtion is illustrated at waveform J and it represents balance of the bridge.

Qualitatively, the operation of the bridge circuit may also be explained as follows. During each of the pulses of waveform H, capacitor 102 accepts a certain charge. During the next following interval between pulses the discharge of this capacitor through resistor 106 is opposed by the residual voltage $V_2$ of waveform H. Upon proper proportioning of the circiut elements 102, 104 and 106 the result will be zero current through resistor 106 during the intervals between pulses. In our copending application we have shown how from these data the ratio $V_2T_2/V_1T_1$ may be obtained and how this ratio may properly be regarded as the tangent of a phase shift angle.

The application to the bridge 70 of the voltage between the receiver stakes requires energization of relay 78. Voltage for this purpose is developed in the channel 76. Bursts of the 800 c.p.s. ripple voltage occuring at $2/T_f$ repetition rate are applied from the output of amplifier 110 to the rectifier 116, with which may be associated a band pass filter centered at $2/T_f$ frequency. This signal may then be sent through an amplifier 118, and goes thence to a rectifier and integrating network 120 whose output is applied to the coil of relay 78.

After the bridge 70 has been adjusted for minimum output while the transmitter is delivering waveform G, the transmitter is shifted to waveform G'. The disappearance of the bursts of ripple voltage at the input to channel 76 results in opening of relay 78. This protects the receiver electrodes 64 and 66 from polarization at the surfaces thereof due to flow of current.

When the transmitter moves on to waveform G'' and the relays 78 and 74 are again energized, the former continuously and the latter at a $2/T_f$ rate, it is found that the output of amplifier 80 is no longer zero. Instead, the recorder 88 exhibits on its short-time constant channel a signal as shown in FIG. 9A, and on its long-time constant channel a signal as shown in FIG. 9B. These signals contain the envelope of a sinusoidal oscillation at the frequency $1/T_f$ (the only one passed by amplifier 80) having a declining amplitude. The sawtooth appearance of FIG. 9B is due to the periodic short-circuiting of the output of integrating circuit 86 by switch 92. Integrating circuits 84 and 86 may have time constants of the order of the times $T_f$ and 1,000 $T_f$ respectively.

The waveforms of FIGS. 9A and 9B are useful supplements to the phase shift data obtained in bridge 70 prior to application of the long D.C. pulse to the transmitter electrodes in the process of estimating the presence and the nature of mineral deposits in the region between the transmitter and receiver electrodes or stakes. According to our present understanding and experience the change in phase shift due to application of a D.C. current pulse to the transmitter electrodes is an indication of the possible presence of cupriferous sulfides and lead sulfides.

Switches 96 and 92 are operated, in the embodiment illustrated in FIG. 2, by a motor 94 energized at the beginning of A.C. transmission waveform G' and G'' by a relay 95 connected in parallel with relay 78. Motor 94 may include an automatic re-set mechanism so that the operation of switches 92 and 96 occurs at specified intervals after the end of the D.C. pulse at the transmitter. Switch 96 energizes relay 97 for a short period, for example five seconds, at intervals which may be of the order of five minutes. This substitutes a selected fraction of the voltage between the receiver stakes at the input of the amplifier 80 for the output of bridge 70. FIG. 9A shows a corresponding peak labeled $V_{in}$ which, in conjunction with data on the amplitude of the current pulses at the transmitter, gives information as to the gain stability of the amplifier 80. The amplitude of the current pulses at the transmitter my be obtained from recording ammeters 37 and 39 connected in series with the transmitter stakes.

The voltage between the receiver stakes which gives rise to the records of FIGS. 9A and 9B is shown at waveform H'' in FIG. 8. It is seen to include a slowly decaying D.C. component, indicated at the dotted line 45. In addition, the residual pulses between the main pulses of opposite polarity are changed in amplitude and shape. Waveform H'' is choped by relay contacts 74–1 in accordance with waveform I'' unchanged from waveform I. The input to the amplifier has now changed from waveform J to waveform J''. This comprises a series of unipolar pulses of slowly declining amplitude and $2/T_f$ repetition rate, shown at waveform $J_1''$, on which are superposed the residual voltages of waveform $J_2''$. Waveform $J_2''$ has a fundamental component of frequency $1/T_f$, and this is the component which passes through amplifier 80. It is shown at waveform K'' in FIG. 8 as a sinusoidal oscillation of slowly declining amplitude, the rate of decay being much exaggerated in FIG. 8.

According to another feature of the invention, an improved signal to noise ratio is obtained in the receiver by the use of an electrode configuration as illustrated in FIG. 4.

In FIG. 4 the receiver electrodes 64 and 66 connect to the ends of a potentiometer 130, and the receiver 68 is connected between the movable tap on this potentiameter and a third stake 67 which is driven into the earth at a point preferably half way between stakes 64 and 66. In terms of the circuit of FIG. 2, it is to the conductor 71 of that figure, leading to the differentiating capacitor 102 of bridge 70, which connects to the tap on potentiameter 130, and it is conductor 73, connecting with the far end of resistor 106 and with chassis ground, which connects to the third stake 67. This arrangement of three stakes in conjunction with the receiver of FIG. 2 is illustrated in FIG. 6.

With the receiver connected to three electrodes as in FIG. 4, or in FIGS. 2 and 6, noise voltages in the earth between electrodes 64 and 67 combine subtractively in the receiver with the noise voltages appearing between electrodes 67 and 66. The same is true of the signal voltages, but an enhancement of signal to noise ratio is obtained even through the absolute magnitude of the signal voltage to the receiver is reduced. This is true because the gradient of the signal voltage, which originates in the relatively nearby transmitter, changes more rapidly with distance from the transmitter than does the gradient of the noise voltages whose sources are in general farther away.

When three electrodes are employed as in FIG. 4, it is desirable to disconnect the electrodes 64 and 66 from the receiver separtely during the application of the D.C. pulse to the ground by the transmitter. For this reason in FIG. 6 a second pair of contacts 78–2 is provided on the relay 78, connected between the electrode 66 and potentiometer 130. The arrangement of FIGS. 4 and 6 is desirable because the magnitude of the change produced by the D.C. pulse G' of FIG. 8 in the phase angle $\theta = \tan^{-1} V_2T_2/V_1T_1$, and of which change the amplitude of waveform $J_2''$ in FIG. 8 is a measure, is of the order of 0.1%. Hence it may be necessary to take all practicable steps to raise the signal to noise ratio. The amplitude of the current pulses delivered by the transmitter to the ground cannot be raised without limit, and amplitudes of the order of 10 to 20 amperes for these pulses are convenient.

Still further improvement in signal to noise ratio may in general be obtained with the electrode configuration of FIG. 5, whose application to the receiver of FIG. 2 is illustrated in FIG. 7. In this arrangement, the electrode 67 of FIG. 4 is replaced by two "transverse" electrodes 67' and 67'', driven into the earth on opposite sides of the line joining electrodes 64 and 66. These electrodes connect to the opposite ends of a potentiometer 132, and the "ground" input conductor 73 of the receiver connects to the tap on this potentiometer.

With the configuration of FIGS. 4 and 6 the tap on potentiometer 130 is adjusted for minimum output from the receiver with the transmitter turned off. With the configuration of FIGS. 5 and 7 the potentiometers 130 and 132 are adjusted successively for minimum receiver output with the transmitter turned off. For these adjustments a hand switch 79 may be provided to energize relay 78 from a battery 81.

The present invention advantageous employed in conjunction with that of our copending application already identified. By means of that invention, i.e., with a transmitter current wave according to waveform G of FIG. 8, and with measurement of the phase angle.

$$\theta = \tan^{-1}\frac{V_2T_2}{V_1T_1}$$

indicated by bridge balance in the receiver, there may be determined the probable presence of a sulfide mineral deposit, and also estimates may be made of its position, size and depth. The present invention then permits assessment of the types of sulfides contained in the deposit. The separation of the adjacent transmitter and receiver electrodes, i.e., the electrodes 4 and 64 in FIGS. 3 and 5 may be of the order of the estimated depth of the deposit. Similarly the separation of the receiver electrodes 64 and 66 (in FIG. 3) or of electrodes 64 and 67 and hence of electrodes 67 and 66 also, in FIGS. 4 and 5, may be of the order of the estimated depth of the deposit. The separation of the transmitter electrodes 2 and 4 may be five or ten times the separation of electrodes 4 and 64. All of the transmitter and receiver electrodes are preferably allowed to remain in the earth a minimum of 8 to 12 hours before the transmitter is turned on, in order to allow them to come to electrochemical equilibrium.

With the receiver energized, adjustment of potentiometers 130 and 132 is made (if receiver electrodes are employed according to FIGS. 4 and 5) to minimize the noise input to the receiver. The transmitter is then energized to develop the alternating current waveform G. This is achieved in transmitter of FIG. 1 by setting switch 20 therein to its position 4. The receiver is then adjusted for zero output, by adjustment of resistors 104 and 106 in the embodiment of FIG. 2. The transmitter and receiver may be allowed to operate in this fashion for a substantial period of time, of the order of one hour, in order to determine, from the record of receiver output, any absence of stability in the transmitter or receiver or their electrodes.

The transmitter is then shifted to waveform G' of one polarity, by setting the switch 20 to position 1, and allowed to deliver a uniform continuous current to the ground for a period which may be of the order of one hour. The transmitter is then restored to A.C. operation, developing waveform G''. Upon the application of waveform G'' to the ground the receiver automatically reconnects its input to the receiver electrodes and sets its recorder in motion. The departure of the receiver output from zero, as recorded in the recorder, is a voltage which is a measure of the change $\Delta \theta$ produced by the now-expired D.C. transmitter current waveform G'. The transmitter is continued on A.C. operation, and the receiver is allowed to continue its record, until the receiver output returns to zero, i.e., until the effect of the D.C. transmitter signal G' disappears, $\Delta \theta$ declining to zero. This may require one or two hours. When the bridge output has returned to zero, the signal voltage applied to the receiver electrodes has returned to waveform H, for which the bridge is in balance.

A second D.C. transmitter signal of reversed polarity is then applied to the ground of the same duration as the first, by setting switch 20 in the transmitter to position 7. The transmitter is thereafter once more set to develop the A.C. signal of waveforms G and G'', and the receiver is allowed to record the change $\Delta \theta$ produced by this reversed polarity D.C. transmitter signal.

The receiver can be calibrated to permit determination of the value of the $\Delta \theta$'s represented by the recorded output of the receiver. With the receiver output returned to zero after a transmitted D.C. signal (or prior to operation of the transmitter except on A.C.), a record is taken of the receiver output for various increments in one of the receiver elements 102, 104 and 106 by means of which the receiver output has been brought to zero. From the values of the components 102, 104 and 106 the relation of $\Delta \theta$ to recorded receiver output can be computed. The value of $\Delta \theta$ can be determined by unbalancing the bridge, i.e., by changing a selected one of components 102, 104 and 106 by the amount necessary to reduce the amplifier output to zero.

If the receiver output or unbalance voltage representative of $\Delta \theta$, which initially appears when the transmitter is returned to A.C. operation after delivery of the D.C. signal of waveform G' is zero for both polarities of the transmitter D.C. signal, the mineral deposit is probably pyrite or some other iron sulfide, or magnetite or graphite. If this initial receiver output has a non-zero value for either or both polarities of the D.C. transmitter signal, the mineral deposit under investigation may contain either cupriferous or lead sulfides or both.

We claim:

1. In geophysical exploration, the method which comprises applying to spaced transmitter electrodes in the earth a first signal including periodic current pulses spaced by time intervals, measuring between spaced receiver electrodes in the earth the component of voltage having the periodicity of said pulses which appears during the intervals between said pulses, then applying to said transmitter electrodes a second signal comprising a unipolar current for a time long compared to said periodicity, then re-applying said first signal to said transmitter electrodes, and then measuring between said receiver electrodes the amplitude of said component.

2. In geophysical exploration, the method which comprises applying to spaced transmitter electrodes in the earth a first signal comprising periodic current pulses of successively opposite polarity spaced by time intervals, measuring between spaced receiver electrodes in the earth the component of voltage having the periodicity of said pulses which appears during the intervals between said pulses, then applying to said transmitter electrodes a second signal comprising a unipolar current pulse long compared to the reciprocal of said periodicity, then re-applying said first signal to said transmitter electrodes, and then measuring between said receiver electrodes the amplitude of said component as a function of time.

3. In geophysical exploration, in combination, a transmitter including means to apply to spaced transmitting electrodes in the earth selectively a first periodic signal including successive pulses of current of opposite polarity and a second signal including a unipolar current, and a receiver connected to measure between spaced receiver electrodes in the earth the component of voltage having the periodicity of said first signal occurring between adjacent of said pulses before and after the application by the transmitter of said second signal, said receiver comprising a circuit containing series-connected resistance and capacity elements, said reeciver further comprising a switching amplifier tuned to a frequency equal to twice said periodicity, means coupling two of said receiver electrodes to the input to said amplifier, a signal amplifier tuned to said periodicity, first switching means controlled by said switching amplifier to couple a resistance element of said circuit to the input of said signal amplifier periodically at twice said periodicity, and second switching means controlled by said switching amplifier to couple two of said receiver electrodes to said circuit so long as said switching amplifier receives a signal at a frequency equal to twice said periodicity, said switching amplifier being effective to operate said first and second switching means in response to an input to said switching amplifier at twice said periodicity.

4. In geophysical exploration, a receiver comprising two input terminals, a series circuit including capacity and resistance, a signal amplifier tuned to a selected frequency, a switching amplifier tuned to twice said frequency having its input coupled between said terminals, first switching means controlled by said switching amplifier to couple the voltage across an element of resistance in said circuit to the input of said signal amplifier periodically at twice said selected frequency, a second switching means effective when closed to connect said circuit between said terminals, and means responsive to the existence of voltage between said terminals to hold said second switching means closed.

5. In geophysical exploration, a receiver for amplification of signals appearing between spaced earthed electrodes, said receiver including two terminals for connection to such electrodes and a circuit containing series connected resistance and capacity elements, said receiver further comprising a switching amplifier tuned to twice a selected frequency, means coupling said terminals to the input to said amplifier, a signal amplifier tuned to said selected frequency, first switching means controlled by said switching amplifier to couple the voltage across a resistance element of said circuit to the input of said signal amplifier periodically at twice said selected frequency, and second switching means responsive to the existence of voltage at said terminals to couple said circuit between said terminals.

6. In geophysical exploration, a receiver comprising at least three spaced earthed electrodes, said electrodes being substantially collinear, a potentiometer coupled between the outer two of said electrodes, a circuit including at least one resistive element and at least one capacitive element coupled between the tap on said potentiometer and the third of said electrodes, an amplifier, and means responsive to a periodic voltage between two of said electrodes to couple the voltage across said resistive element periodically to the input to said amplifier.

7. In geophysical exploration, a receiver comprising at least three spaced substantially collinear earthed electrodes, a potentiometer and a switch coupled in series between the outer two of said electrodes, a circuit including at least one capacitive element and at least one resistive element coupled between the tap on said potentiometer and the third of said electrodes, an amplifier, and means responsive to a periodic voltage of selected frequency between two of said electrodes to couple the voltage across said resistive element periodically at said frequency to the input to said amplifier and to close said switch so long as said periodic voltage appears between said two electrodes.

8. In geophysical exploration, a receiver comprising a plurality of spaced earthed electrodes of which four are disposed in a quadrilateral array, two potentiometers coupled one between the electrodes of each pair of diagonally opposite electrodes of said array, a resistor and a capacitor connected in series between the taps on said potentiometers, a signal amplifier, a switching amplifier having its input coupled to two of said electrodes, and switching means operated by said switching amplifier to couple the voltage across said resistor periodically to the input to said signal amplifier.

9. In geophysical exploration, a receiver comprising a plurality of spaced electrodes of which four are disposed in a quadrilateral array, a switch connected in series with a first potentiometer between one pair of diagonally opposite of said four electrodes, a second potentiometer coupled between the other pair of diagonally opposite ones of said electrodes, a series circuit including at least one capacitive element and at least one resistive element connected between the taps on said potentiometers, a signal amplifier, a switching amplifier having its input connected between two of said electrodes, switching means operated by said switching amplifier to couple the voltage across said resistive element periodically to the input of said signal amplifier, and means operated by said switching means to close said switch.

10. In geophysical exploration, a receiver comprising a plurality of spaced earthed electrodes of which four are disposed in a quadrilateral array, two switches connected in series with a first potentiometer between them between one pair of diagonally opposite of said four electrodes, a second potentiometer coupled between the other pair of diagonally opposite ones of said electrodes, a series circuit including at least one capacitive element and at least one resistive element connected between the taps on said potentiometers, a signal amplifier, a switching amplifier having its input connected between two of said electrodes, switching means operated by said switching amplifier to couple the voltage across said resistive element periodically to the input to said signal amplifier, and means operated by said switching means to close said switches.

11. In geophysical exploration, the method of identifying a subterranean mineral deposit which comprises applying to the earth between spaced transmitter electrodes in the vicinity of the deposit a low frequency alternating current, measuring at spaced receiver electrodes the ratio of the out-of-phase to the in-phase component of voltage at said frequency, applying to the earth between said transmitter electrodes a direct current for a time long compared to the period of said alternating current, then reapplying to said transmitter electrodes said alternating current, and measuring the change in said ratio.

12. In geophysical exploration, the method of identifying a subterranean mineral deposit which comprises applying to the earth between spaced transmitter electrodes in the vicinitiy of the deposit a low frequency alternating current measuring at spaced receiver electrodes the ratio of out-of-phase to in-phase component of voltage at said frequency applying to the earth between said transmitter electrodes a direct current of one polarity for a time long compared to the period of said alternating current, then reapplying to said transmitter electrodes said alternating current, measuring the change in said ratio, then applying to the earth between said transmitter electrodes a direct current of the opposite polarity for a time long compared to the period of said alternating current, then reapplying to the earth at said transmitter electrodes said alternating current, and measuring the change in said ratio.

13. Apparatus for geophysical exploration comprising an oscillator for generation of a square voltage wave, two output terminals, two rectifiers, a common output circuit for said rectifiers, selector switching means connectable in one position between said oscillator and rectifiers to cause one of said rectifiers to deliver a pulse of unidirectional current to said output circuit during odd numbered cycles of said oscillator and to cause the other of said rectifiers to deliver a pulse of unidirectional current during even numbered cycles of said oscillator, and reversing switch means responsive to successive pulses in said output circuit to deliver such successive pulses from said output circuit to said output terminals in opposite polarity, said selector switching means being insertable in another position between said oscillator and rectifiers to cause one of said rectifiers to conduct during one half of said square wave and the other of said rectifiers to conduct during the other half of said square wave.

References Cited by the Examiner
UNITED STATES PATENTS

| | | | |
|---|---|---|---|
| 2,644,130 | 6/1953 | Summers | 324—1 |
| 3,113,265 | 12/1953 | Woods et al. | 324—1 |

WALTER L. CARLSON, *Primary Examiner.*

SAMUEL BERNSTEIN, *Examiner.*

G. R. STRECKER, *Assistant Examiner.*